United States Patent
Ouchi et al.

(10) Patent No.: US 7,290,873 B2
(45) Date of Patent: Nov. 6, 2007

(54) INK JET RECORDING METHOD

(75) Inventors: Akemi Ouchi, Ibaraki (JP); Tsutomu Maekawa, Ibaraki (JP); Hidetoshi Fujii, Ibaraki (JP); Kunihiro Tamahashi, Ibaraki (JP); Yutaka Shoji, Ibaraki (JP)

(73) Assignee: Ricoh Printing Systems, Ltd., Tokyo (JP)

( * ) Notice: Subject to any disclaimer, the term of this patent is extended or adjusted under 35 U.S.C. 154(b) by 414 days.

(21) Appl. No.: 11/082,063

(22) Filed: Mar. 17, 2005

(65) Prior Publication Data

US 2005/0208233 A1    Sep. 22, 2005

(30) Foreign Application Priority Data

Mar. 18, 2004 (JP) ............ P 2004-078191
Dec. 17, 2004 (JP) ............ P 2004-365641

(51) Int. Cl.
*G01D 11/00* (2006.01)
*B41J 2/01* (2006.01)

(52) U.S. Cl. .............. 347/100; 347/102; 347/105
(58) Field of Classification Search ......... 347/100, 347/102, 105, 101
See application file for complete search history.

(56) References Cited

U.S. PATENT DOCUMENTS

| | | | | |
|---|---|---|---|---|
| 5,662,997 A | * | 9/1997 | Onishi et al. | 428/331 |
| 5,718,793 A | * | 2/1998 | Inamoto et al. | 156/235 |
| 5,984,468 A | * | 11/1999 | Malhotra | 347/102 |
| 6,238,047 B1 | * | 5/2001 | Suzuki et al. | 347/105 |

FOREIGN PATENT DOCUMENTS

| | | |
|---|---|---|
| JP | 04-359071 | 12/1992 |
| JP | 04-359072 | 12/1992 |
| JP | 11-202115 | 7/1999 |
| JP | 2000-007968 | 1/2000 |
| JP | 2000-007969 | 1/2000 |
| JP | 2000-007970 | 1/2000 |
| JP | 2000-089023 | 3/2000 |
| JP | 2000-154344 | 6/2000 |
| JP | 2000-290555 | 10/2000 |
| JP | 2001-026736 | 1/2001 |
| JP | 2003-127338 | 5/2003 |
| JP | 2003-136697 | 5/2003 |

* cited by examiner

*Primary Examiner*—Stephen Meier
*Assistant Examiner*—Leonard Liang
(74) *Attorney, Agent, or Firm*—McGinn IP Law Group, PLLC

(57) ABSTRACT

Ink jet recording is performed using an ink that is adjusted such that the thickness dependence rate determined by dividing the difference in optical density between images having an ink layer thickness of 30 μm and 15 μm by the ink layer thickness difference of 15 μm is less than 0.043 per unit layer thickness of 1 μm or ΔEab* between the same hues is 8 or less.

9 Claims, 1 Drawing Sheet

INK JET RECORDING METHOD

BACKGROUND OF THE INVENTION

1. Field of the Invention

The present invention relates to an ink jet recording method for obtaining a high quality recorded matter.

2. Description of the Related Art

As an ink for ink jet recording there has heretofore been widely used a water-soluble liquid ink composition. It has been proposed that droplets of such a water-soluble liquid ink composition be allowed to penetrate readily the recording paper to enhance fixability. The layer of the water-soluble liquid ink composition formed on the recording paper has a thickness of from about 0 to 3 μm (When the thickness of the ink layer is 0 μm, the ink penetrates completely the recording paper). In the case where an ordinary recording paper allowing easy penetration of ink is used, bleeding occurs. Therefore, it is the status quo that the recording medium is limited to special coated paper.

In the case where printing is made on various plastic sheets, these sheets need to be subjected to special surface treatment to have an ink-receptive layer because the ink exhibits poor dryability (see, e.g., JP-A-4-359071, JP-A-4-359072, JP-A-2000-154344, JP-A-2001-26736).

A hot-melt type ink jet recoding method has been proposed involving the use of a hot-melt type ink composition made of a wax which stays solid at room temperature, etc. as an ink composition capable of providing a good recording quality regardless of the recording medium used. In the proposed hot-melt type ink jet recoding method, the hot-melt type ink composition is liquefied by heating or like means, and then given some energy so that it is ejected onto the recording medium where it is cooled and solidified while being attached thereto to form recorded dots (see, e.g., JP-A-2000-7968, JP-A-2000-7969, JP-A-2000-7970).

Further, a hot-melt type ink composition for ink jet recording aimed at the realization of so-called four-color system high quality full-color printing on the basis of definition of maximum chroma of various colors has been proposed (see, e.g., JP-A-2000-290555).

Moreover, a recording method which can be used for various recording media has been proposed as a recording method using an ink for ink jet recording method which is cured by ultraviolet rays or electron beam (see, e.g., JP-A-2000-136697).

Further, an ink jet printer process has been proposed which comprises reducing the period between the time of ejection of UV ink onto the recording medium and the time of curing and fixing by irradiation with ultraviolet rays to enhance the image color precision (see, e.g., JP-A-2003-127338).

In the art of color filter production, it has been proposed to control the ink layer thickness for the purpose of eliminating color unevenness (see, e.g., JP-A-2000-89023, JP-A-11-202115).

For an ink which is cured when irradiated with ultraviolet rays or electron beam, an ink jet printer has been proposed which comprises a light source mounted on the head carriage so that the recording medium is irradiated with light from the light source in the vicinity of the site hit by the ink droplet. However, this arrangement is disadvantageous in that the mounting of the light source adds to the weight of the head carriage, requiring the use of a complicated driving system for the head carriage for the purpose of withstanding the raised load and hence adding to the size and cost of the device.

On the other hand, in the case where the ink is cured when the recording medium passes through a light source portion provided downstream from the head carriage in the direction of conveyance of the recording medium, it takes from about several milliseconds to 1 second to cure and fix the ink which has been ejected from the recording head onto te recording medium by irradiation with light beam. Therefore, ink bleeding or fading (color unevenness) can occur under some working conditions such as characteristics of ink or recording medium or some atmospheric conditions such as temperature.

When the occurrence of bleeding or color unevenness is followed by the fixing of the ink, such a phenomenon forms an image as it is, causing image color precision drop or instability. In particular, when recording is made on a film or coated cardboard free of ink-absorbing layer, the resulting image quality depends also on between the surface energy of the film or coated cardboard and the ink, making the ink layer thickness different from the center to end of the image and hence causing color unevenness that deteriorates image quality.

The piezoelectric oscillator to be incorporated in the nozzles normally vary in displacement from unit to unit. Thus, the amount of ink to be ejected from the nozzles vary to cause color unevenness unless the displacement of these piezoelectric oscillators are made even.

In order to eliminate these problems, a countermeasure has been proposed which comprises varying the voltage applied to the piezoelectric oscillator in the nozzles to inhibit the dispersion of displacement of the piezoelectric oscillators. However, this approach involving the application of different driving signals to the piezoelectric oscillators is disadvantageous in that a driving signal producing circuit must be provided for each of the nozzles, adding to cost.

It is well known in the art that high quality printing requires the limitation of the optical density and color difference to specific range. However, in a recording method involving printing to an ink layer thickness of 15 μm or more and requiring much time to fix the ink, no countermeasure against color unevenness during ink jet printing is taken from the standpoint of control over physical properties of ink.

SUMMARY OF THE INVENTION

An object of the invention is to provide an ink jet recording method which gives an enhanced image color precision to provide high quality recorded matters.

According to a first aspect of the invention, an ink jet recording method includes recording images with an ink including a pigment on a recording medium, in which the ink is cured when irradiated with at least one of ultraviolet ray and electron beam, a layer thickness dependence rate per 1 μm of the ink is less than 0.043. When the ink layer thickness at the center and end of the image are 30 μm and 15 μm respectively, a layer thickness dependence rate is less than 0.043 or ΔEab* between same hues is 8 or less, the layer thickness dependence rate is defined by following equation (1):

$$\Delta D = (OD_h - OD_l)/(t_h - t_l) \qquad (1)$$

where $OD_h$ is the optical density of the end of the recorded area, $OD_l$ is the center of the recorded area, $t_h$ is the thickness of ink layer at the end of the recorded area, $t_l$ is the thickness of ink layer at the center of the recorded area.

According to a second aspect of the invention, when the ink layer thickness at the center and end of the image are 20 μm and 15 μm respectively, a layer thickness dependence rate is 0.060 or less, or Eab* between the same hues is 8 or less.

According to a third aspect of the invention, when the ink layer thickness at the center and end of the image are 30 μm and 25 μm respectively, a layer thickness dependence rate is 0.035 or less, or ΔEab* between the same hues is 8 or less.

According to a fourth aspect of the invention, the recording is made by a line type printer which performs recording by ejecting an ink through a plurality of nozzles disposed opposed to a recording medium in a non-contact manner and arranged over the entire width of the recording medium at a predetermined gap.

According to a fifth aspect of the invention, the line type printer includes a inkjet head recording; and a light-irradiation unit provided at downstream from the inkjet head in a conveying direction of the recording medium.

According to a sixth aspect of the invention, the ink provides an accent-colored recording matter having at least one of no colors combined and no colors overlapped on the recording medium.

According to a seventh aspect of the invention, the recording medium is a cardboard.

According to a eighth aspect of the invention, the ink jet recording method as defined above, further comprises ejecting an ink that is cured at an integrated ultraviolet radiation dose of from 200 to 1,500 mJ/cm$^2$ by a light-irradiation unit.

According to a ninth aspect of the invention, the ink has a viscosity of from 15 to 30 mPa·s at 25° C., a surface tension of from 20 to 29 mN/m and an optical density of 1.6 or more at an ink layer thickness of 20 μm.

An ink jet recording method can be provided which prevents the rise of size and cost of recording device and gives a high quality recorded matter having a good image color precision.

DETAILED DESCRIPTION OF THE PREFERRED EMBODIMENTS

The ink of the invention is not intended to realize full-color printing using a so-called four-primary color system involving the combined use of various colors but is intended to realize accent-colored printing with a monochromatic color. An accent-colored recording matter has no colors combined or overlapped on the recording medium. The thickness dependence rate (ΔD) of optical density of the invention is determined by the following equation (1).

$$\Delta D = (OD_h - OD_l)/(t_h - t_l) \quad (1)$$

where $OD_h$ and $OD_l$ are the optical density of the end and the center of the recorded area, respectively, and $t_h$ and $t_l$ are the thickness of ink layer at the end and the center of the recorded area, respectively.

The color difference in the same image is represented by color difference (ΔEab*) according to L*a*b* color specification system and is determined by the following equation (2).

$$\Delta Eab^* = [(L^*o - L^*l)^2 + (a^*o - a^*l)^2 + (b^*o - b^*l)^2]^{1/2} \quad (2)$$

where L*o, a*o and b*o are the lightness and chroma of the center of the recorded area, respectively, and L*1, a*1, b*1 are the lightness and chroma of the end of the recorded area, respectively. In the actual measurement, a Type Σ90 color difference meter (produced by NIPPON DENSHOKU CO., LTD.) was used. As a light source there was used D65. The viewing angle was 2°.

Figure 1:
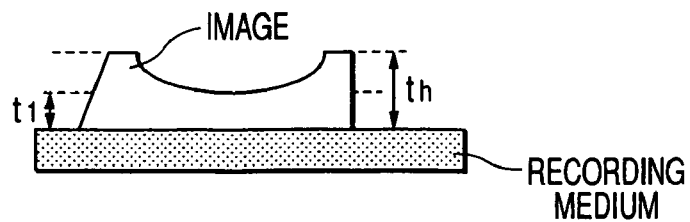
FIG. 1 is a diagram illustrating an example of an image recorded with an ink according to the invention.

Referring to ink layer thickness, when recording is made on a coated paper or film free of ink-absorbing layer or a film such as polyolefin having a low polarity, a brimmed image such as letter having a thickened end is obtained. This phenomenon is regarded as color unevenness that causes the deterioration of image quality. Focusing the ink layer thickness, the thickness of the center and end of an image were measured. As a result, it was found that there is a difference in ink layer thickness between center and end of image. In the case where there is the greatest difference in ink layer thickness between center and end of image, the ink layer thickness at the center of the image is about 15 μm and the ink layer thickness at the end of the image is about 30 μm as shown in FIG. 1.

When the ink layer thickness at the center and the end of the image are 30 μm and 15 μm, respectively, the difference (th-$_1$) in ink layer thickness between at the center and the end of the image is 15 μm. When recording is made with an ink adjusted to ΔD of less than 0.043 or ΔEab* of 8 or less, a recorded matter can be obtained free of color unevenness regardless of the kind of coloring material of ink, ink preparing method, etc. This will be described in detail later in examples and comparative examples.

The optical density (OD) at an ink layer thickness of 20 μm is preferably 1.6 or more. More preferably, the optical density at an ink layer thickness of 15 μm is 1.4 or more. It is particularly preferred that the optical density at an ink layer thickness of 30 μm be 2.0 or more. However, in order to prevent the reduction of curing rate due to the incorporation of coloring agent, OD at an ink layer thickness of from 20 to 30 μm is preferably from 1.6 to 2.0. More preferably, the ink is prepared such that OD doesn't depend on the ink layer thickness and saturates at an ink layer thickness of 20 μm.

As the ink jet recording device there may be used a recording head comprising a piezoelectric element for on-demand type ink jet recording. As the recording method there may be used any recording method such as line type recording, serial type recording and transfer type (shuttle type) recording. The invention is useful particularly in line type recording, which is suitable for high speed fixing and performs recording by ejecting an ink through a plurality of nozzles disposed opposed to a recording medium in a non-contact manner and arranged over the entire width of the recording medium at a predetermined gap. Although the recording speed is definitely limited, it is particularly preferred that the recording speed be such that the relative speed between the nozzle and the paper is 10 ips (inch/sec) or more to make effective use of the ink composition of the invention. In order to realize a recording speed of 10 ips, it is necessary that the image be fixed in about 1 second after recorded. Since ink bleeding or fading (color unevenness) can occur on the recording medium in 1 second under some working conditions such as ink properties and recording medium properties or some atmospheric conditions such as temperature, the invention is effective. The distance between the forward end of the recording head and the position at which the ink droplet hits the paper is preferably from about 1 to 3 mm.

An example of the recording device embodying the invention will be described hereinafter in connection with FIG. 3.

Figure 3:
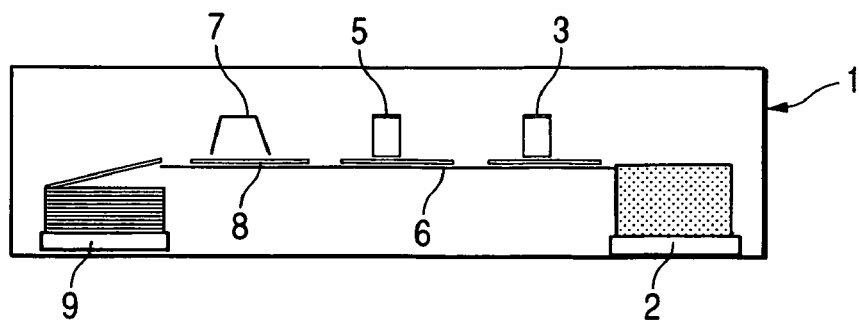
FIG. 3 is a sectional diagram illustrating an example of the recording device according to the invention.

In FIG. 3, the reference numeral 1 indicates an ink jet recording device. A recording medium 8 is conveyed from a paper feed portion 2 over a conveyor belt 6. Using ink jet heads 3 and 5, two-color recording is conducted. The image thus recorded is then cured and fixed in an irradiation machine 7. The printed matters are then discharged to a stacker 9. The irradiation machine 7 uses ultraviolet ray, electron beam or other radiations.

Examples of the light-irradiation device for curing ink droplet to form an image include ultraviolet ray (UV) emitting lamp, and electron beam irradiator. Since such a UV emitting lamp generates heat that can deform the recoding body, it is desired that a cooling mechanism such as cold mirror, cold filter and work cooler be provided.

Examples of the ultraviolet ray lamp include electrode lamps such as high pressure mercury vapor lamp, ultrahigh pressure mercury vapor lamp and metal halide lamp, and electrodeless lamps. Examples of the electrodeless lamps include H bulb, H plasma bulb, D bulb, V bulb, Q bulb, and M bulb (produced by Fusion UV Systems, Inc.). The metal halide lamp, D bulb, and V bulb have a wide wavelength range and thus are effective for colored matters. Halides of metal such as Pb, Sn and Fe may be used. These metal halides may be selected according to absorption spectrum of photopolymerization initiator. These lamps may have an output of 80, 120, 160, 240 or 320 W/cm. Any of these lamps may be used without limitation so far as they are effective for curing. Lamps having different wavelengths may be used in combination. Alternatively, two or more same type of lamps may be used.

Further, a mechanism provided with a hot air drier for raising speed may be used. In order to effect curing efficiently, it is also effective to irradiate the ink layer with radiations through an oxygen barrier layer made of a polyvinyl alcohol or the like formed thereon. The integrated radiation dose is inversely proportional to the speed of the recording medium passing under the light source. The integrated radiation dose is preferably from 200 to 1,500 mJ/cm$^2$, more preferably from 200 to 1,000 mJ/cm$^2$, even more preferably from 200 to 800 mJ/cm$^2$ in the UVA wavelength range of from 320 to 390 nm. When the integrated radiation dose in the UVA wavelength range of from 320 to 390 nm falls below 200 mJ/cm$^2$, the ink layer having a thickness of more than 30 μm can be easily left uncured. When the integrated radiation dose in the UVA wavelength range of from 320 to 390 nm exceeds 1,500 mJ/cm$^2$, it is unsuitable for high speed recording. It is also disadvantageous in that the resulting heat generation causes deformation of recording medium and other troubles.

For the measurement of UV intensity and integrated radiation dose, an illuminator is normally used. In order to reduce the difference between equipments and keep the measurement atmosphere constant, UV Power Pack (produced by EIT Inc.), which can make measurement over a wide wavelength range, including UVC, UVB, UVA and UVV, at a time, can be used for further convenience. When a cooling mechanism such as cold mirror, cold filter and work cooler is provided, deterioration can be inhibited.

The effective UV intensity in UVA wavelength range is from 3,000 to 5,000 mW/cm$^2$, preferably from 3,000 to 4,800 mW/cm$^2$, more preferably from 3,200 to 4,7000 mW/cm$^2$. Referring to the reason for the limitation of UV intensity, when the effective UV intensity falls below 3,000 mW/cm$^2$, the ink layer is undercured. On the contrary, when the effective UV intensity is not smaller than 5,000 mW/cm$^2$, an expensive device is required. Further, the required ink must comprise a large amount of photopolymerization initiator or auxiliary incorporated therein, adding to the cost of ink.

Examples of the method of judging curing include IR analysis, rubbing method, and thumb twist method. The thumb twist method may be used for further convenience. In some detail, thumb is pressed against the recorded matter. The pressed area is then observed visually or through a magnifier to see if there is any image disturbance.

The ink of the invention preferably exhibits a viscosity of from 15 to 30 mPa·s, particularly from 15 to 25 mPa·s, most preferably from 18 to 23 mPa·s at 25° C. Referring to the reasons for this limitation, an ink having a low viscosity normally tends to have poor droplet form and frequency characteristics. On the contrary, an ink having a high viscosity has excellent high frequency characteristics and thus is suitable for high speed recording. Since the ink composition which comprises a high viscosity monomer or oligomer incorporated therein to have some flexibility or adhesivity exhibits a raised viscosity, the head or the ink feed system may be heated to a temperature of from about 40 to 80° C. so that an ink having a lowered viscosity can be ejected. However, in the case where the viscosity of the ink is higher than 30 mPa·s at 25° C., the ink droplet cannot be stably ejected unless the ejection temperature is raised. It is thus necessary that the device be heated not only at the ink ejection portion but also at the ink feed system. This disadvantageously reduces the period during which the ink can be stably stored. The surface tension of the ink of the invention at room temperature is preferably from 20 to 29 mN/m, more preferably from 20 to 26 mN/m, most preferably from 20 to 25 mN/m. When the surface tension of the ink falls below 20 mN/m, the resulting ink can be unstably ejected. On the contrary, when the surface tension of the ink exceeds 29 mN/m, the resulting ink exhibits deteriorated packing properties.

In general, an ink having a high surface tension exhibits a stable droplet form during flying but exhibits poor wetting properties with respect to the recording device and thus can be difficultly fed. The ink composition preferably exhibits Newton fluid behavior at the working temperature, but there maybe present some shear rate dependence of apparent viscosity without any problem so far as the ink composition shows conformance with the above defined conditions at the shear rate used in ordinary measurement (about 20 to 100 rpm).

The invention is useful in the case where the recording medium is a cardboard. The invention is useful particularly for coated cardboard having a coat layer. Even when an offset printing coated cardboard free of ink-receptive layer for ink jet recording but having a white coat layer provided on the surface thereof is used, high quality recording can be made by the recording method of the invention. In the case where the recording medium has an ink-receptive layer for ink jet recording provided thereon, the ink can be absorbed by the ink-receptive layer in the depth direction to form an ink layer to a small thickness, causing no bleeding and little color unevenness. Further, since a coated cardboard having a white coat layer provided on the surface thereof has a dense coat layer, the ink droplet penetrates little the coat layer. Thus, the invention is useful particularly for such a coated cardboard. However, in the case where an ordinary cardboard is used, a step of irradiating ink droplets with ultraviolet rays or the like shortly after attached to the cardboard to cure the ink droplets is needed to prevent the ink droplets from running along the fibers of the paper.

Referring further to the ink formulation, the photo-sensitive monomer accounts for 10 to 70% by weight of the ink composition. As effective photo-sensitive monomer there may be used a monomer having a relatively low viscosity having a radical-polymerizable unsaturated double bond in its molecular structure or the like.

Preferred examples of such a monomer include monofunctional groups such as 2-ethylhexyl (meth)acrylate (EHA), 2-hydroxyethyl (meth)acrylate (HEA), 2-hydroxypropyl (meth)arylate (HPA), caprolactone-modified tetrahydrofuryl (meth)acrylate, isobonyl (meth)acrylate, 3-methoxybutyl (meth)acrylate, tetrahydrofuryl (meth)acrylate, lauryl (meth)acrylate, 2-phenoxyethyl (meth)acrylate, isodecyl (meth)acrylate, isooctyl (meth)acrylate, tridecyl (meth)acrylate, caprolactone (meth)acrylate and ethoxylated nonylphenyl (meth)acrylate, bifunctional groups such as tripropylne glycol di(meth)acrylate, triethylene glycol di (meth)acrylate, tetraethylene glycol di(meth)acrylate, polypropylene glycol di(meth)acrylate, neopentyl glycol hydroxypivalic acid ester di(meth)acrylate (MANDA), hydroxypivalic acid neopentyl glycol ester di(meth)acrylate (HPNDA), 1.3-butanediol di(meth) acrylate (BGDA), 1.4-butanediol di(meth)acrylate (BUDA), 1.6-hexanediol di(meth)acrylate (HDDA), 1.9-nonane diol di(meth)acrylate, diethylene glycol di (meth) acrylate (DEGDA), neopentyl glycol di(meth)acrylate (NPGDA), tripropylne glycol di(meth)acrylate (TPGDA), caprolactone-modified hydroxypivalic acid neopentyl glcyol ester di(meth)acrylate, propoxylated neopentyl glycol di(meth)acrylate, ethoxylated bisphenol A di(meth)acrylate, polyethylene glycol 200 di(meth)acrylate and polyethylene glycol 400 di(meth)acrylate, and polyfunctional groups such as trimethylolpropane tri(meth)acrylate (TMPTA), pentaerythritol tri(meth)acrylate (PETA), dipentaerythritol hexa(meth)acrylate (DPHA), triallylisocyanate, ε-caprolactone-modified dipentaerythritol (meth)acrylate, tris (2-hydroxyethyl)isocyanurate tri(meth) acrylate, ethoxylated trimethylolpropane tri(meth)acrylate, propoxylated trimthylolpropane tri(meth)acrylate, propoxylated glyceryl tri(meth)acrylate, pentaerythritol tetra(meth) acrylate, ditrimethylol propane tetra(meth)acrylate, dipentaerythritolhydroxy penta(meth)acrylate, ethoxylated pentaerythritol tetra(meth)acrylate and penta(meth)acrylate ester.

As the oligomer there may be used any of acrylates or methacrylates of polyester-based resins, acrylic resins, epoxy-based resins, urethane-based resins, alkyd resins, ether-based resins, polyvalent alcohols, etc. without any limitation. Alternatively, water-soluble resins and emulsion type photo-sensitive resins may be used.

As the vehicle there may be used one or a mixture of two or more of these compounds. In order to reduce the viscosity of the vehicle and raise the recording speed, the vehicle may comprise water or a solvent incorporated therein. Any solvent may be used so far as it can fairly dissolve the constituents of the ink composition therein and can be readily evaporated after recording.

A photopolymerization initiator may be incorporated the ink composition in an amount of from 1 to 10% by weight based on the total amount of the vehicle. Examples of such a photopolymerization initiator include benzoin ether-based photopolymerization initiators, acetophenone-based photopolymerization initiators, benzophenone-based photopolymerization initiators, benzophenone, thioxanthone-based photopolymerization initiators, and other special groups such as acrylphosphine oxide and methyphenyl glyoxylate. There may be selected benzoin alkyl ether, benzyl methyl ketal, hydroxycyclohexyl phenyl ketone, p-isopropyl-α-hydroxy isobutylphenone, 1.1-dichloroacetophenone, 2-chlorothioxanthone, etc. As the photopolymerization initiator there may be one or a mixture of two or more of these compounds. Examples of photopolymerization initiation aids employable herein include triethanolamine, 2-dimethylaminobenzoic acid ethyl, 4-dimethylaminobenzoic acid isoamyl, and polymerizable tertiary amine. Besides these compounds, photopolymerization initiator-containing photo-sensitive resins may be used.

The coloring agent to be used herein is not specifically limited. In the invention, however, organic or inorganic pigments having the following number listed in color index may be used. Since the invention is useful particularly to obtain accent-colored recorded matters showing conformance with characteristics such as symbol mark of company, coloring agents having various hues may be used.

For example, as a white pigment there may be used zinc sulfide, titanium dioxide, Pigment White 6 or the like. As a red or magenta pigment there may be used Pigment Red 2, 3, 5, 9, 14, 17, 19, 22, 23, 31, 37, 38, 41, 42, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 210, 216, 226, 238, 257 or Pigment Orange 5, 13, 16, 20, 34, 36. As a blue or cyan pigment there may be used Pigment Blue 1, 15, 15:1, 15:2, 15:3, 15:4, 15:6, 16, 17-1, 22, 27, 28, 29, 36, 60. As a green pigment there may be used Pigment Green 7, 26, 36, 50. As a yellow pigment there may be used Pigment Yellow 1, 3, 12, 13, 14, 17, 34, 35, 37, 55, 63, 65, 73, 74, 81, 83, 93, 94, 95, 97, 98, 106, 108, 109, 110, 114, 121, 126, 136, 137, 138, 139, 153, 154, 155, 157, 166, 167, 168, 174, 176, 180, 185, 188, 193. As a black pigment there may be used Pigment Black 7, 28, 26. These pigments may be used depending on the purpose.

The optimum amount of these pigments to be incorporated is from 1 to 30 parts by weight. When the amount of these pigments falls below 1 part by weight, the resulting image exhibits deteriorated quality. On the contrary, when the amount of these pigments exceeds 30 parts by weight, the viscosity of the ink is adversely affected. Two or more of these coloring agents may be used in proper admixture for the purpose of color adjustment.

In order to provide the ink composition of the invention with further functionalities, the ink composition of the invention may further comprise various sensitizers, light-stabilizers, slipping agents, surface treatments, surface active agents, viscosity depressants, oxidation inhibitors, age inhibitors, crosslinking accelerators, polymerization inhibitors, plasticizers, preservatives, dispersants and leveling agents incorporated therein.

The density of printed matters varies with recording conditions such as amount of ink and number of dots and ink preparing conditions such as coloring power and particle diameter of coloring material and compatibility of coloring material with solvent. The use of an ink for ink jet recording which is defined such that the layer thickness dependence rate as defined herein is less than 0.043 per unit layer thickness of 1 μm or ΔEab* between the same hues is 8 or less makes it possible to obtain recorded matters free of color unevenness without limiting the kind of coloring material of ink and the preparation method. Even when the optical density of the printed matters obtained by actual printing can be difficultly measured, color unevenness on the actually printed matters can be forecasted because an ink layer having an arbitrary thickness can be prepared by bar coater method.

The invention will be further described in the following examples, but the invention is not limited thereto.

EXAMPLE 1

Using a homogenizer (Type HG 30, produced by Hitachi Koki Co., Ltd.), 10 parts byweight of urethane acrylate (trade name: KAYARAD UX2201, produced by NIPPON KAYAKU CO., LTD.) and 65 parts by weight of a triethylene glycol diacrylate (trade name: SR272, produced by NIPPON KAYAKU CO., LTD.) as vehicle, 10 parts by weight of an acrylic additive (trade name: L1984, produced by Kusumoto Chemicals, Ltd.), 3 parts by weight of a photopolymerization initiator (trade name: Irgacure 184, produced by Ciba Specialty Chemicals, Ltd.), 2 parts by weight of a photopolymerization initiator (trade name: Irgacure 819, produced by Ciba Specialty Chemicals, Ltd.) and 10 parts by weight of a black pigment (trade name: MA77, produced by MITSUBISHI CHEMICAL CORPORATION) as a coloring agent were subjected to dispersion in a total amount of 300 g at a rotary speed of 2,000 rpm until a homogeneous mixture was obtained. Subsequently, the mixture was filtered to remove impurities. As a result, a homogeneous ink composition was obtained.

Using a Type SJ02A direct printing plate preparing machine (produced by Hitachi Koki Co., Ltd.), this ink composition was then subjected to recording on a Type JET Star coated cardboard (produced by NIPPON DAISHOWA PAPERBOARD Co, Ltd.) at an ink ejection speed of 3 kHz and a paper feed speed of 10 ips. The recorded matters were then cured at an integrated radiation dose of 200 and 1,500 mJ/cm$^2$ using a metal halide lamp. Both the two samples were confirmed by thumb twist method to have cured. The thickness of the ink layer was then measured at a number of sites by means of a digimatic micrometer produced by Mitutoyo Corporation. As a result, it was found that there had been sites at which the thickness of the ink layer are 15, 20 and 30 μm, respectively. OD was then measured at these sites using RD 919 (produced by Macbeth Inc.). From the measurements was then calculated ΔD. ΔEab* was measured by means of a color difference meter.

For the measurement of ink viscosity, a Type EDL rotary viscometer (produced by TOKIMEC INC.) was used. For the measurement of surface tension of ink, a Type CVBP-Z automatic surface tension meter (produced by Kyowa Interface Science Co., LTD.) was used. The measurement temperature was 25° C. at both the methods. As can be seen in the measurements shown in FIG. 2 and Table 1 below, the resulting recorded matters showed no color unevenness and thus were considered on practical level.

in the same manner as in Example 1. The resulting recorded matters showed no color unevenness and thus were found to be on practical level.

COMPARATIVE EXAMPLE 1

Figure 2:
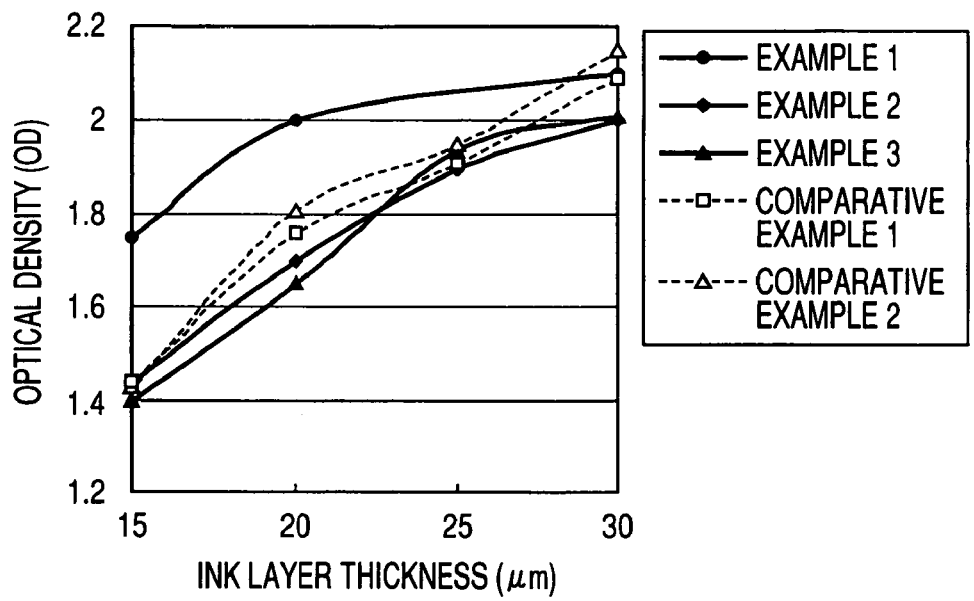
FIG. 2 illustrates the relationship between the ink layer thickness and the optical density (OD) of inks according to the invention and comparative inks.

An ink was prepared and evaluated in the same manner as in Example 2 except that the amount of the coloring agent and the acrylic agent to be incorporated were changed to 3 parts by weight and 12 parts by weight, respectively. The measurements are shown in FIG. 2 and Table 1. Recording was made in the same manner as in Example 1. However, the resulting recorded matters showed some color unevenness and thus were found to be not on practical level.

COMPARATIVE EXAMPLE 2

An ink was prepared and evaluated in the same manner as in Example 2 except that the amount of the coloring agent and the acrylic agent to be incorporated were changed to 7 parts by weight and 8 parts by weight, respectively. The measurements are shown in FIG. 2 and Table 1. Recording was made in the same manner as in Example 1. However, the resulting recorded matters showed some color unevenness and thus were found to be not on practical level. Further, since the ink exhibited a high viscosity and a high surface tension, the ejection of the ink was not stabilized, making it impossible to perform continuous recording.

As mentioned above, in the case where the ink layer thickness at the center and end of the image are 30 μm and

TABLE 1

|  | Example 1 | Example 2 | Example 3 | Comparative Example 1 | comparative Examples 2 |
| --- | --- | --- | --- | --- | --- |
| OD at layer thickness of 15 μm | 1.75 | 1.44 | 1.4 | 1.44 | 1.43 |
| OD at layer thickness of 20 μm | 2 | 1.7 | 1.65 | 1.76 | 1.81 |
| OD at layer thickness of 25 μm | — | 1.9 | 1.94 | 1.91 | 1.95 |
| OD at layer thickness of 30 μm | 2.1 | 2 | 2.01 | 2.09 | 2.15 |
| ΔD (30-15 μm) | 0.023 | 0.037 | 0.041 | 0.043 | 0.048 |
| ΔD (20-15 μm) | 0.050 | 0.052 | 0.050 | 0.064 | 0.076 |
| ΔD (30-25 μm) | — | 0.020 | 0.014 | 0.036 | 0.040 |
| ΔEab* (30-15 μm) | 6.5 | 8.0 | 7.8 | 17.1 | 16.5 |
| ΔEab* (20-15 μm) | 4.3 | 5.0 | 5.5 | 8.7 | 8.5 |
| ΔEab* (30-25 μm) | — | 5.2 | 5.8 | 9.4 | 8.1 |
| Viscosity (mPa · s @25° C.) | 22 | 19 | 19 | 17 | 31 |
| Surface tension (mN/m@25° C.) | 25 | 22 | 22 | 19.8 | 30 |

EXAMPLE 2

An ink was prepared in the same manner as in Example 1 except that the pigment used in Example 1 was replaced by a red pigment (trade name: SEIKAFastRed 8040, produced by Dainichiseika Color & Chemicals Mfg. Co., Ltd.). In order to obtain samples having different thicknesses, the ink was then spread over a coated cardboard using bar coaters (#10, 14, 16 and 20), and then cured in the same manner as in Example 1. The measurements are shown in FIG. 2 and Table 1. Recording was made in the same manner as in Example 1. The resulting recorded matters showed no color unevenness and thus were found to be on practical level.

EXAMPLE 3

The evaluation procedure of Example 2 was followed except that the coated cardboard of Example 2 was replaced by a Type New V Mat calendered paper (produced by MITSUBISHI PAPER MILLS LIMITED.). The measurements are shown in FIG. 2 and Table 1. Recording was made 15 μm, respectively, when ΔD is more than 0.043 or ΔEab* is more than 8, the image shows remarkable color unevenness and thus cannot be practically used. ΔD and ΔEab* are preferably smaller. ΔD is preferably 0.041 or less. ΔEab* is preferably 7 or less. ΔD is more preferably 0.040 or less. ΔEab* is more preferably 5 or less.

In the case where the ink layer thickness at the center and end of the image are 20 μm and 15 μm, respectively, it is preferred that ΔD be 0.060 or less and ΔEab* be 8 or less. When ΔD is more than 0.060 or ΔEab* is more than 8, the image shows remarkable color unevenness and thus cannot be practically used. ΔD and ΔEab* are preferably smaller. ΔD is preferably 0.055 or less. ΔEab* is preferably 7 or less (see FIG. 2). ΔD is more preferably 0.052 or less. ΔEab* is more preferably 5 or less.

In the case where the ink layer thickness at the center and end of the image are 30 μm and 25 μm, respectively, it is preferred that ΔD be 0.035 or less and ΔEab* be 8 or less. When ΔD is more than 0.035 or ΔEab* is more than 8, the image shows remarkable color unevenness and thus cannot be practically used. ΔD and ΔEab* are preferably smaller. ΔD is preferably 0.03 or less. ΔEab* is preferably 7 or less.

ΔD is more preferably 0.020 or less. ΔEab* is more preferably 5 or less.

In the case where the ink layer thickness at the center and end of the image are 25 μm and 20 μm, respectively, the samples of Comparative Examples 1 and 2 exhibited a smaller ΔD than Examples 2 and 3 but showed some color unevenness on the recorded matters. Thus, the aforementioned range of ink layer thickness is not suitable for the definition of ΔD.

The ink for ink jet recording according to the invention is made of an ultraviolet- or electron beam-curing resin and thus has a high solvent resistance and chemical resistance. Thus, the ink for ink jet recording according to the invention and the ink jet recording device using the ink are suitable for printing on various electronic materials which are cleaned with an organic solvent or the like at a process for the production of printed circuit board, etc.

Further, the recording device of the invention can be used in related art ink jet printers capable of ejecting small ink droplets only when printing is needed, e.g., office printer, printers for use in industrial marking, wide format type printers, plate-making printers, label printers and all types of printers having this typical operations.

Examples of the recording medium employable herein include paper, plastic film, capsule, gel, metal foil, glass, wood, and cloth. Since the ink jet recording method of the invention allows non-contact printing, the recording medium may have various shapes. Thus, the invention is not limited to these materials.

What is claimed is:

1. An ink jet recording method comprising:
    recording images with an ink including a pigment on a recording medium,
    wherein the ink is cured when irradiated with at least one of ultraviolet ray and electron beam,
    a layer thickness dependence rate per 1 μm of the ink is less than 0.043,
    when the ink layer thickness at the center and end of the image are 30 μm and 15 μm respectively, a layer thickness dependence rate is less than 0.043 or ΔEab* between same hues is 8 or less, the layer thickness dependence rate is defined by following equation (1):

$$\Delta D = (OD_h - OD_l)/(t_h - t_l) \quad (1)$$

where
   $OD_h$ is the optical density of the end of the recorded area,
   $OD_l$ is the center of the recorded area,
   $t_h$ is the thickness of ink layer at the end of the recorded area,
   $t_l$ is the thickness of ink layer at the center of the recorded area.

2. The ink jet recording method according to claim 1, wherein, when the ink layer thickness at the center and end of the image are 20 μm and 15 μm respectively, a layer thickness dependence rate is 0.060 or less, or Eab* between the same hues is 8 or less.

3. The ink jet recording method according to claim 1,
   wherein when the ink layer thickness at the center and end of the image are 30 μm and 25 μm respectively, a layer thickness dependence rate is 0.035 or less, or ΔEab* between the same hues is 8 or less.

4. The ink jet recording method according to claim 1, wherein the recording is made by a line type printer which performs recording by ejecting an ink through a plurality of nozzles disposed opposed to a recording medium in a non-contact manner and arranged over the entire width of the recording medium at a predetermined gap.

5. The ink jet recording method according to claim 4, wherein the line type printer comprises:
    a inkjet head recording; and
    a light-irradiation unit provided at downstream from the inkjet head in a conveying direction of the recording medium.

6. The ink jet recording method according to claim 1, wherein the ink provides an accent-colored recording matter having at least one of no colors combined and no colors overlapped on the recording medium.

7. The ink jet recording method according to claim 1, wherein the recording medium is a cardboard.

8. The ink jet recording method according to claim 1, further comprising ejecting an ink that is cured at an integrated ultraviolet radiation dose of from 200 to 1,500 mJ/cm$^2$ by a light-irradiation unit.

9. The ink jet recording method according claim 1, wherein the ink has a viscosity of from 15 to 30 mPa·s at 25° C., a surface tension of from 20 to 29 mN/m and an optical density of 1.6 or more at an ink layer thickness of 20 μm.

* * * * *